Fig. 2.

INVENTOR.
W. A. SAWYER
BY
Head & Johnson
ATTORNEYS

Fig. 3.

INVENTOR.
W. A. SAWYER
BY
Head & Johnson
ATTORNEYS

March 31, 1970     W. A. SAWYER     3,503,424
PIPELINE PLUGGING PIG AND METHOD FOR TEMPORARILY
PLUGGING PIPELINES Filed April 22, 1968     8 Sheets-Sheet 5

INVENTOR.
W. A. SAWYER
BY
*Head & Johnson*
ATTORNEYS

United States Patent Office 3,503,424
Patented Mar. 31, 1970

3,503,424
PIPELINE PLUGGING PIG AND METHOD FOR TEMPORARILY PLUGGING PIPELINES
Willard A. Sawyer, 3127 E. 49th St.,
Tulsa, Okla. 74135
Filed Apr. 22, 1968, Ser. No. 723,353
Int. Cl. F16l 55/12
U.S. Cl. 138—97            8 Claims

ABSTRACT OF THE DISCLOSURE

A flow-through pipeline pig having valve controls operable by fluid pressure or mechanical external pipeline actuating devices is used in the repair or replacement of portions of pipelines.

BACKGROUND OF THE INVENTION

Apparatus and methods have been heretofore disclosed as in Patents Nos. 2,929,410 and 3,285,290 for temporarily plugging fluid pipelines to make repairs or other purposes. These devices, however, have not incorporated means for allowing axial fluid flow through the pipe which is desirable under certain circumstances of pipeline repair or testing.

SUMMARY

Accordingly, this invention has for its object to provide a pipeline pig having an axial valve system controllable by exterior positioned means for various phases of pipeline repair or replacement.

DESCRIPTION OF THE PREFERRED EMBODIMENT

Figure 1:
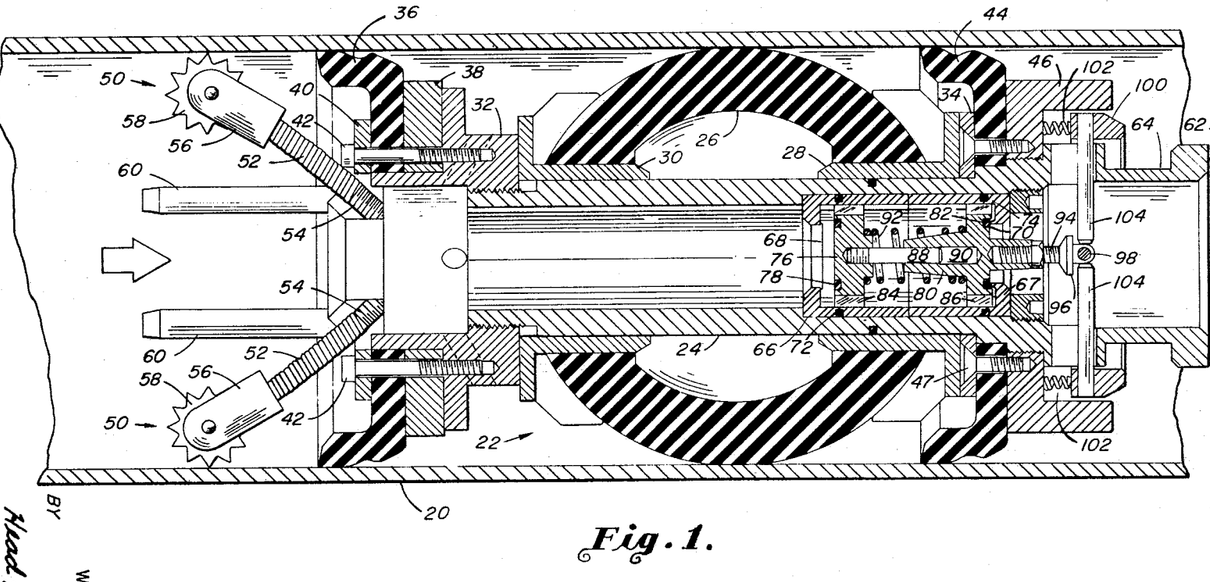
FIGURE 1 is a sectional view of the flow-through pipeline pig of this invention during normal travel down a pipeline.

Referring now to FIGURE 1, the flow-through pipeline pig of this invention is described in the position normally found while traveling in the direction of the arrow (fluid flow direction) within the pipeline conduit 20. The pig, generally designated by the numeral 22, includes a central conduit and mandrel 24 to which a substantially spherical resilient packer 26 is slidably movable. Packer 26 is bonded to a forward cylindrical sleeve 28 and the rearward cylindrical sleeve 30, both of which are slidable upon the exterior of tubular mandrel 24 between the limits of a rearward stop ring 32 and a forward stop portion 34. At the rearward end sealing cup 36 is retained between spacer rings 38 and 40 by a plurality of circumferentially spaced bolt connectors 42. The sealing cups are standard design, of a resilient material and include a rearwardly projecting lip or flange portion which under certain conditions provides a seal against the inner surface of the pipeline 20 when sufficient fluid pressure is applied rearwardly. Under other conditions the sealing members will allow the passage of fluid in a reverse direction as the need may arise. A forwardly mounted sealing cup 44, similar to the rearward member as described, is retained between a forward sleeve 46 and a rearward ring stop 34. Rearwardly attached to the mandrel 24 are signaling devices generally indicated by numeral 50. One or more of these devices may be utilized. Each includes a coil spring member 52 which is threadably attached to all-thread studs 54 and biased radially outwardly. Each coil spring 52 carries a yoke member 56 to which a toothed wheel 58 is rotatably attached. When the plug device of this invention is moved along the plug pipeline, the teeth of the wheels 58 engage the pipe and produce a series of impulses which may be audibly received. Depending upon the number of teeth impulses of different frequencies for different plugging devices will give an indication of the traveling rates and position of the plug device in the pipe as it is moved into and out of position as hereinafter described. Rearwardly of the pig is one or more bumper members 60 which acts to prevent contact with a subsequent or following pipeline pig device.

A forward bumper nose 62 is formed of the inner mandrel and includes an inverted recess 64 to receive the external positioning and control devices as hereinafter described.

Internally of the mandrel is a valve sleeve 66 which includes a rearward seat 68 and a forward seat 70. The cylindrical sleeve is formed of two portions, a rearward portion 66 and a forward portion 67 which are sealed to a recess in the mandrel 24 by respective O-rings 72 and 74. Internally of the sleeve is a rearward valve 76 which includes a resilient seating face 78 for sealing engagement with the seat 68. The forward valve member 80 includes a resilient seating face 82 for sealing engagement with the seat 70. Each of the valves include fluted openings 84 and 86 respectively for passage of fluid as described in the operation. Valve shaft 88 is threaded into the rearward valve 76 and is slidably received within an opening 90 in the forward valve. Spring 92 is of a compression type and is biased to cause the valves 76 and 80 to be directly normally outward of each other. Forwardly of valve 80 and attached thereto by a threaded actuator member 94 having a forward flange 96 is forward nose piece 98. A valve actuating ring 100 is coaxially positioned around the forward portion of the mandrel 24. A plurality of spring members 102 maintains the ring 100 biased normally outwardly as shown in FIGURE 1. A plurality of radially inwardly oriented actuating pins 104 attached to ring 100 and adapted to terminate substantially adjacent the nose portion 98 so as to be capable of striking flange 96 for actuation in the valve as hereinafter described.

Figure 2:
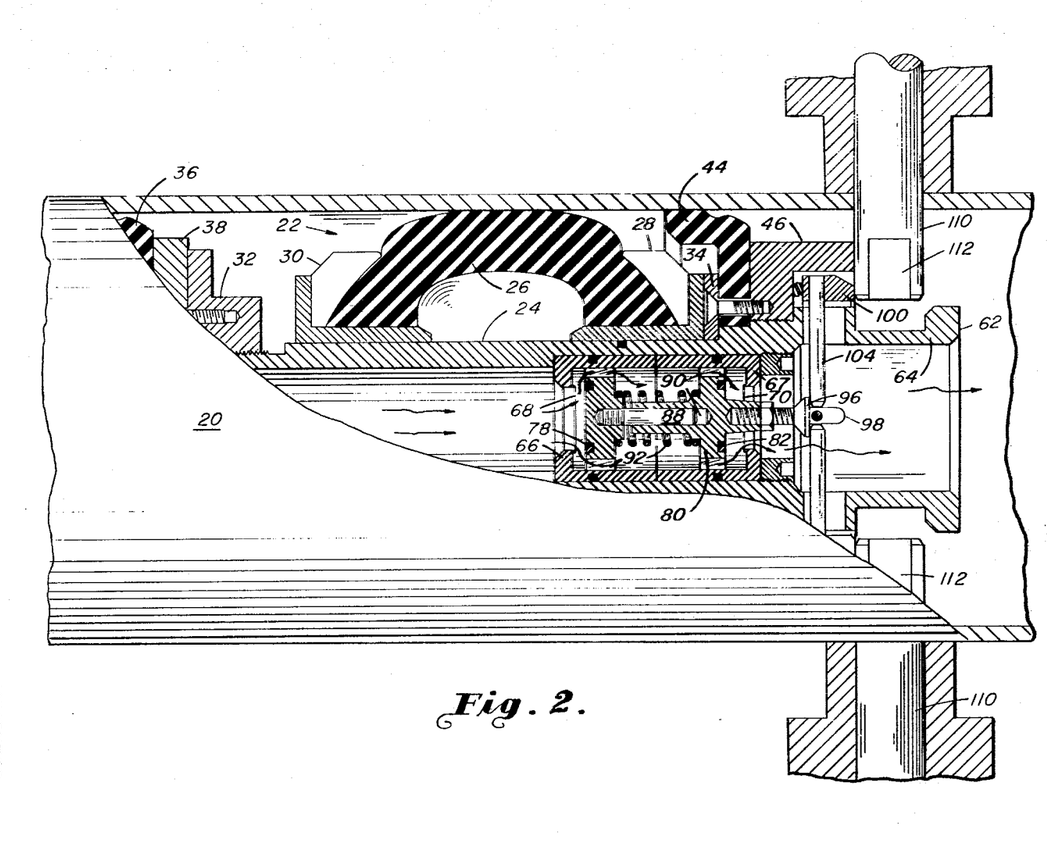
FIGURE 2 is a partial sectional view of the pig of FIGURE 1 in its position after abutting the exterior control elements.
Figure 3:
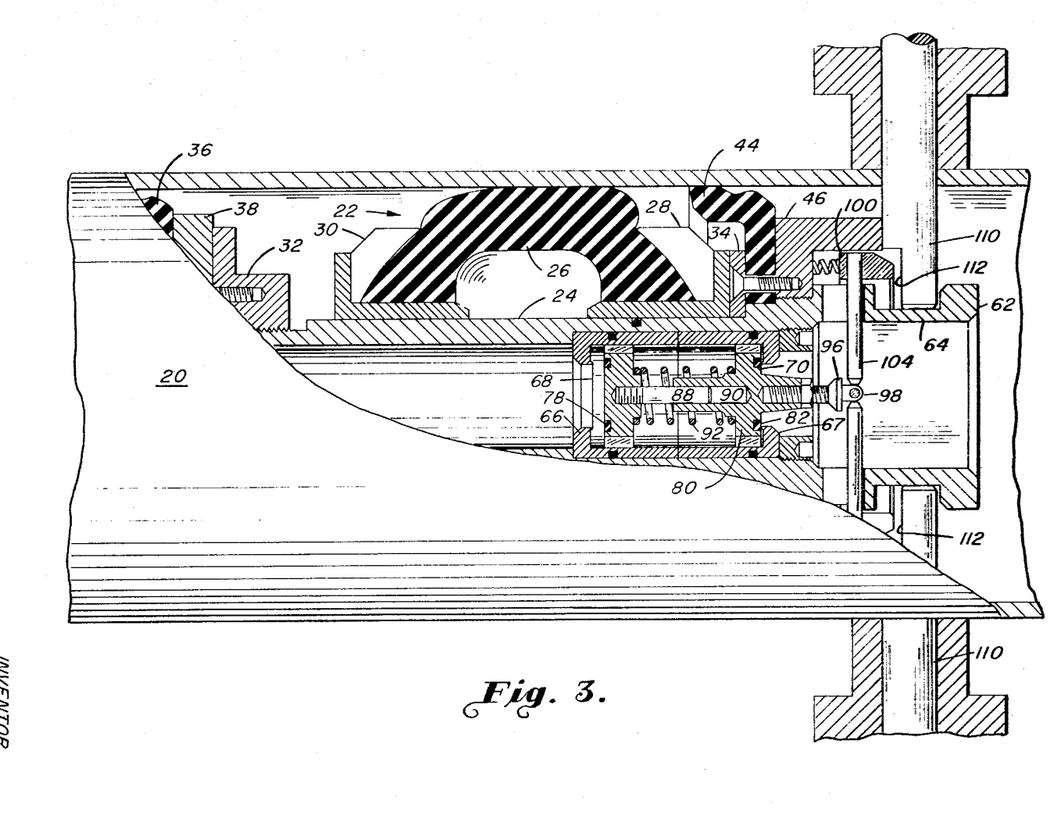
FIGURE 3 is a partial sectional view of the pipeline pig of this invention in a third position during the operation and the method herein.

FIGURES 2 and 3 represent second and third positions of the pig within the pipeline, particularly with respect to the exteriorly operated pig positioning valve operating pins 110 which have been heretofore positioned on the pipe as will be described. Each of the pins includes a flat sided portion 112, which functions, when rotated, to maintain the position of the pig yet provide control over the valve 80.

Figures 5, 6, 10:
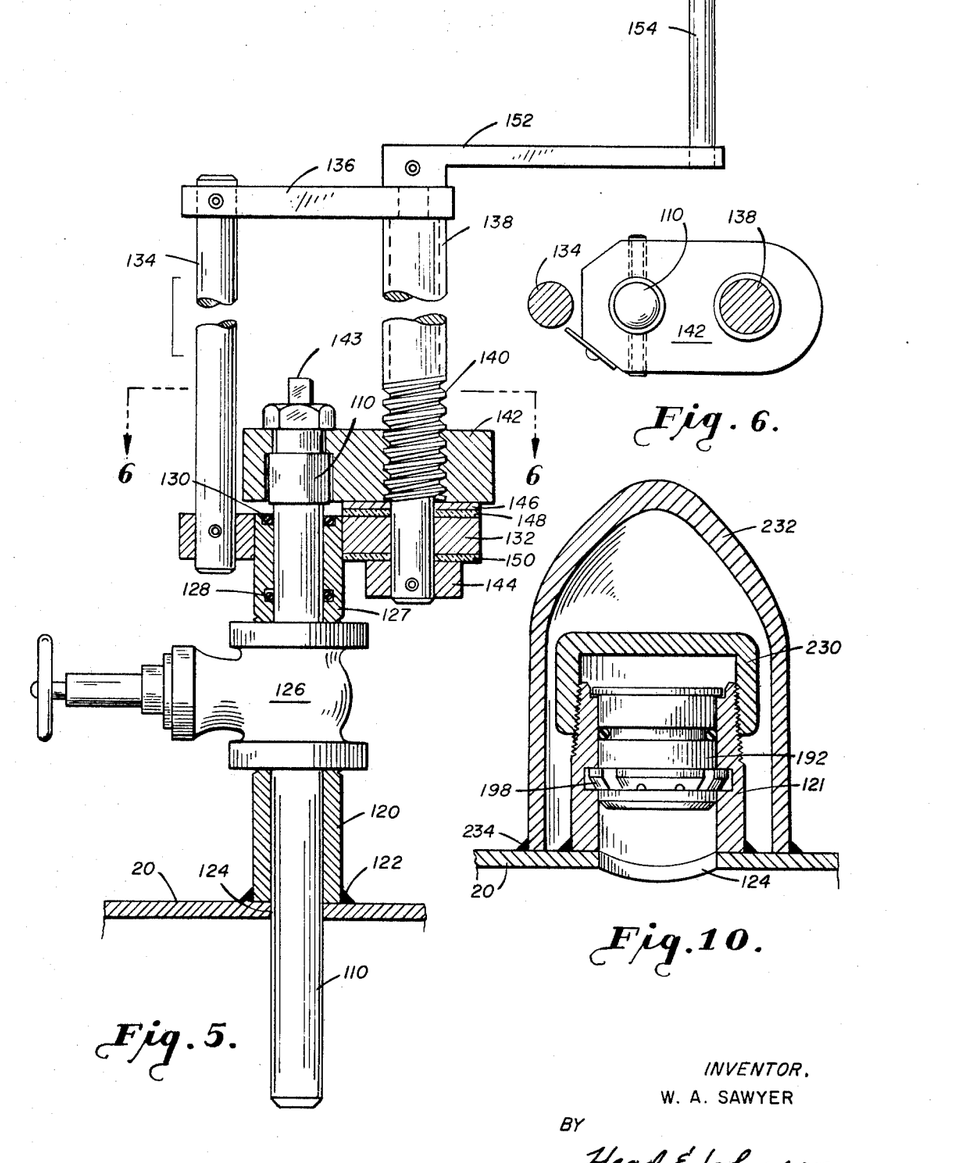
FIGURE 5 is a partial sectional view of the mechanical apparatus for positioning the pig and actuating its flow through a valve.
FIGURE 6 is a top sectional view taken along the line 6—6 of FIGURE 5.
FIGURE 10 is a partial sectional view of a means for sealing the actuator access opening.

Referring now to FIGURES 5 and 6 a mechanical type pig positioning and pig valve controlling mechanism is described. At least one and preferably at least two of these devices are positioned within the same plane transverse to the axis of said pipe 20 and around the periphery thereof for use in first positioning the pipeline pig of this invention and operating the pig valve system from the exterior during the process. An extension member 120 is welded 122 to the pipeline and by means well known to those in the art, such as by self-punching devices, an opening 124 is provided therethrough, usually while the pipeline is under pressure. A valve 126 attached to the extension 120 allows for flow control. An upper extension 127 is likewise attached to the valve and includes O-ring seal members 128 and 130. A lower frame 132 is attached to the upper extension 127 as shown and includes a vertical support 134 and upper horizontal frame 136. A rotatable support member 138 includes a threaded portion 140 which cooperates with a nut 142 which is affixed to control operating pin 110 by a key 143 so as to be movable therewith. The shaft terminates at its lower end with a retainer sleeve 144. A washer 146 is located above a bearing material 148 on the upper side of lower frame 132 while a similar bearing washer 150 is located on the underside. A crank arm 152 and attached rotatable handle 154 are utilized to force the operating pins 110 into and out of the internal pipeline yet be sealed therewith to prevent leakage of fluid. To rotate the operating pin, as needed in the method of operation a wrench face is provided at the top of pin 110.

Figures 7A, 7B:
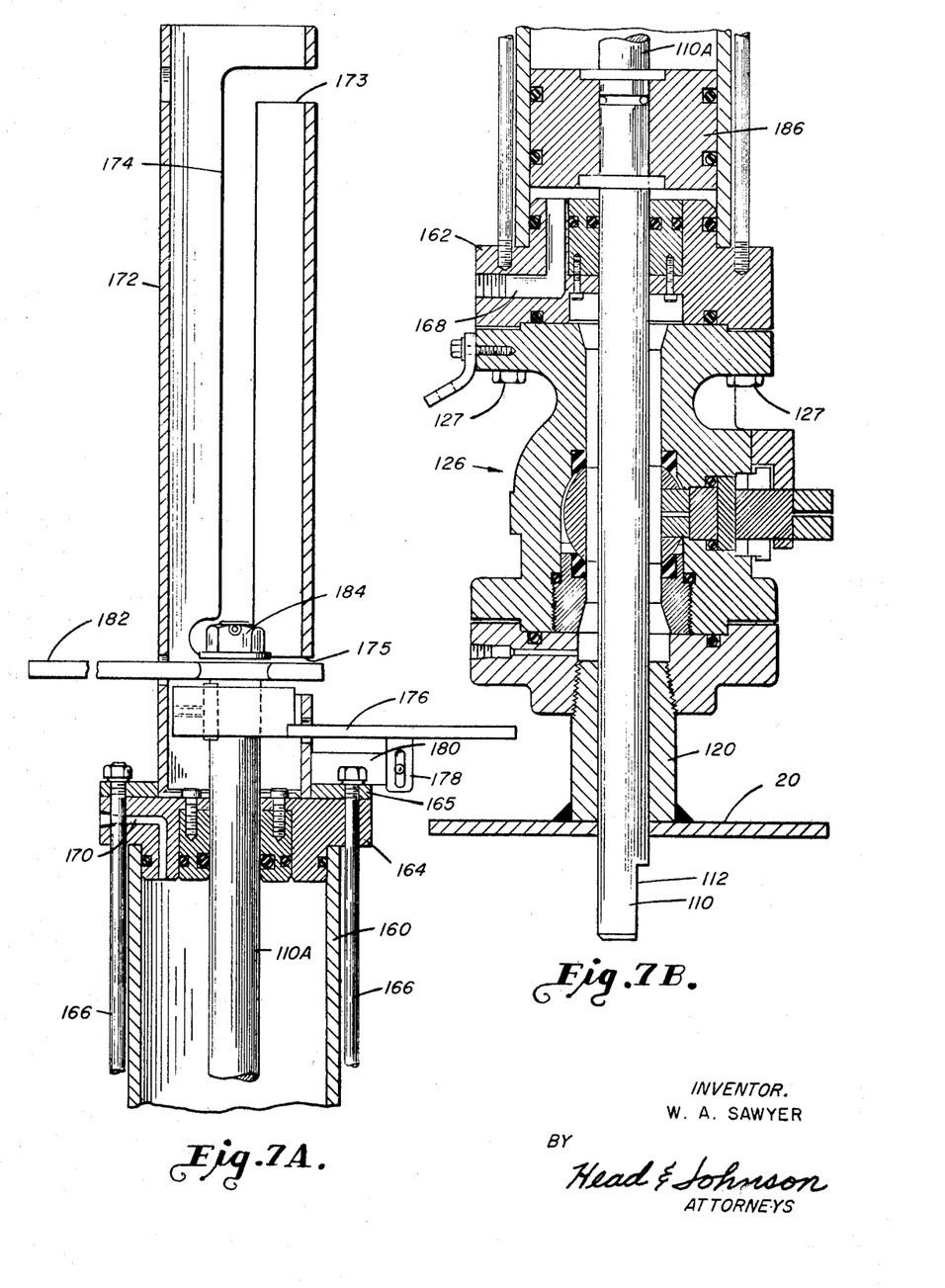
FIGURES 7A and 7B represent an alternate fluid pressure actuating device for positioning and controlling the pig of this invention.

Referring now to FIGURES 7A and 7B a combined hydraulic and mechanical means for operating pin 110 is described. In this embodiment a cylinder 160 includes a lower closure 162 and an upper closure 164, and sealed with respect thereto and held together by longitudinal bolts 166 around the outer periphery thereof. The lower and upper closures include suitable closable openings 168 and 170, respectively. The assembly being positioned above and retained to valve 126 by flange bolts 127 which in turn is attached to extension 120 of the pipeline 20. Extending upwardly from the upper washer 165 is a vertical extension portion 172 which has a substantially vertical slotted portion 174 therein between an upper horizontal opening 173 and a lower horizontal opening 175. A handle and sleeve member 176 is attached to the upper part of operating pin 110A and includes a slotted extension 178 for affixing to plate 180 of the upper extension 172 and hence prevent the movement of the pin 110A. A similar operating handle 182 is likewise attachable to the shaft by a nut 184. In this view, handle 182 and the portion 172 have been rotated approximately 90° to show the slot 174 and that rotation of handle 182 in lower slot 175 will prevent any upward movement thereof. Within the cylinder 160 is piston 186 which by the input and exhaust of pressure fluid into or out of ports 168 and 170 will cause vertical movement of the operating pin 110 and its extension 110A. Once the pin is completely removed through the valve the valve 126 is closed to seal off the pressure fluid from the pipeline.

Figure 8:
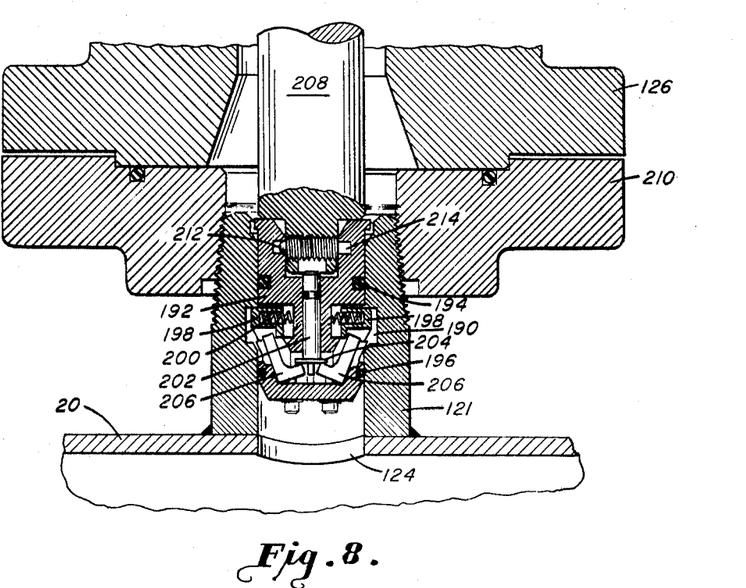
FIGURE 8 is a sectional view of apparatus used in semipermanent plugging of the pipeline pig actuator opening.

Referring now to FIGURE 8 when a semipermanent plugging of the opening 124 is desired an extension member 121 of the internal design shown is welded, or already previously welded as member 120 in previous views, to the pipe 20. This member includes an internal recess 190 into which the plug body 192 is to be inserted and locked. The plug includes upper O-ring seal member 194 for sealing the plug above the recess 190 and an additional O-ring 196 for sealing therebelow. A plurality of recess slips 198 are biased normally outwardly by spring member 200. An axially disposed pin 202 includes a lower flange 204 which is adapted to lock slip actuating dogs 206 associated with each of the slip members 198 when the pin 202 is moved vertically downward. An inserting handle 208 is adapted to be sealably received through the valve flange 126 and a previously attached flange 210. The handle includes a detent ball 212 which is adapted to enter within recess 214 to move the plug 192 into the extension 121. Upon its placement an upward pull of the handle 208 will release the ball detent member from the recess 214, leaving plug 192 in place.

Figure 9:
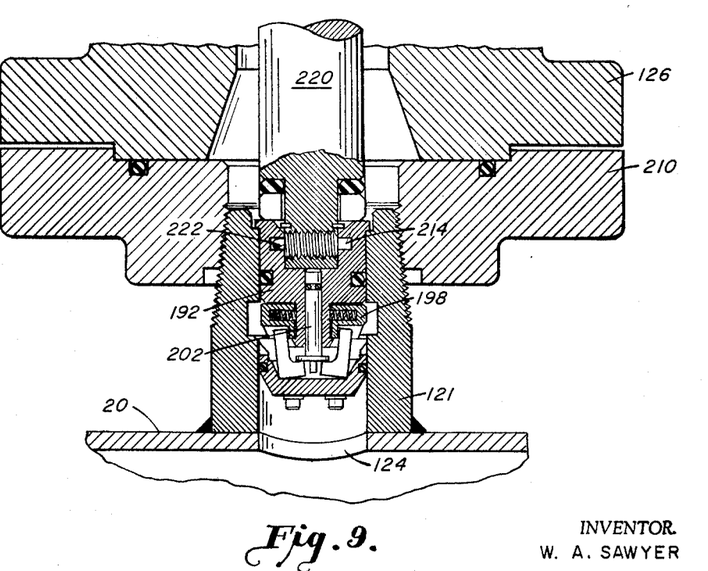
FIGURE 9 is a sectional view of apparatus for removing the temporary plug of FIGURE 8.

In FIGURE 9 a handle member 220 includes a permanent detenting device 222 which is adapted to be received within the recess 214 of the plug 192. That is, device 222 is capable of detenting, yet is of a larger extension such that it will remain within the recess and pull the plug 192 from its position. It is to be noted that the end of the handle 220 is adapted to push shaft 202 downwardly pulling the slip members 198 inwardly for removal therefrom.

FIGURE 10 depicts a perhaps more permanent type installation for opening 124. Extension 121 shown with the plug 192 therein has the valve flange 126 and its associate flange 210 removed therefrom replaced by a cap member 230. To provide even additional seal and prevent tampering a bull plug 232 surrounding the entire elements heretofore described is welded as at 234 to pipe 20.

OPERATION

The operation and methods of this invention may best be described with reference to FIGURES 4A–4E and the sequence thereof generally described.

The section to be removed or repaired within a pipeline is generally designated by the outer vertical dotted line and bracket the section generally referred to by the number 300. Once this area has been determined positions or stations are established as generally designated at a downstream position 302, upstream position 304, and an intermediate position 306. At each of these positions one or more operating pins positions as heretofore described in FIGURES 5, 6 or 7 shall be first established preferably in a common plane transverse to the axis of the pipe 20. Afterwards, the operating pins 110 at stations 302 and intermediate station 306 are moved inwardly to a position to intercept the pipeline pigs of this invention. A first pipeline pig 22A is inserted in an upstream position and will travel within the pipeline in the position shown in FIGURE 1. Fluid flow is prevented from passage through the pig internal valve bodies 66 and 67 because of the seating of the upstream valve 80 against its seat 70 and hence the fluid pressure will operate against sealing cups 36 and 44 to move the pig with the fluid flow until the forward sleeve 46 strikes the operating pins 110 at position 306. In the position shown in FIGURE 2 full flow of fluid will occur through the coaxial valve bodies 66 and 67 because the arcuate portion of operating pin 110 by striking against valve actuating ring 100 will maintain the valve 80 in an open position. In some instances pins 110 will be inserted radially to a position to intercept nose sleeve 46. Subsequent radial movement inward will open the valve as described in FIGURE 2.

Figure 4A:
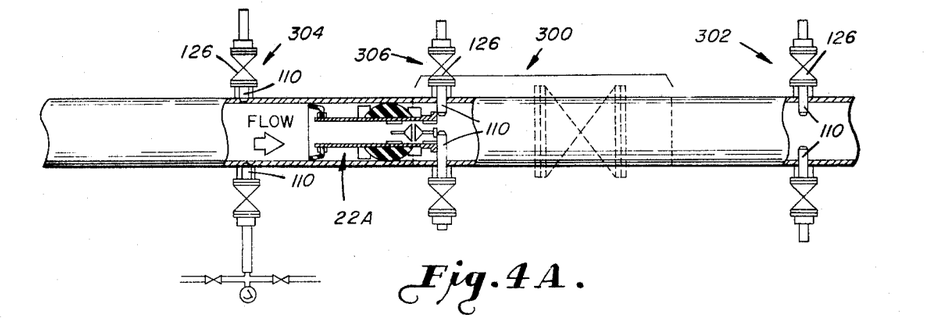
FIGURES 4A through 4E are schematic sequential views depicting the operation of the methods and apparatus herein.
Figure 4B:
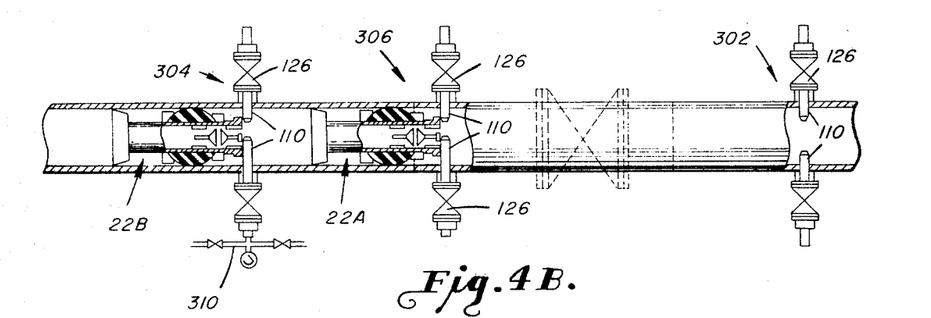
Figure 4C:
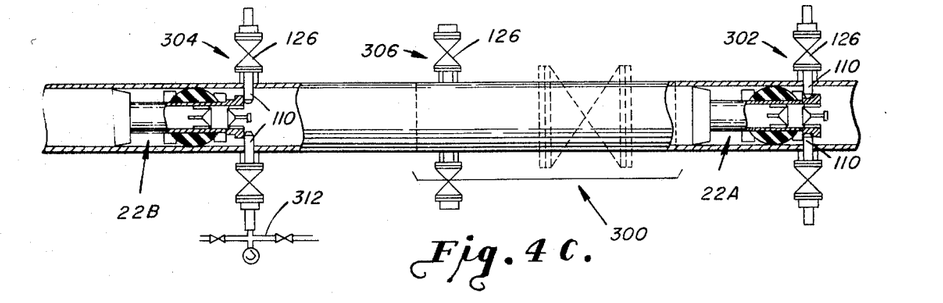
Figure 4D:
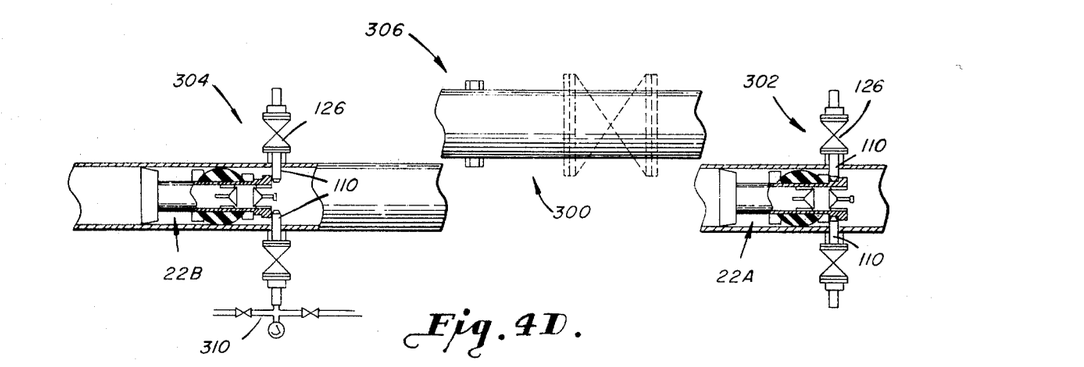
Figure 4E:
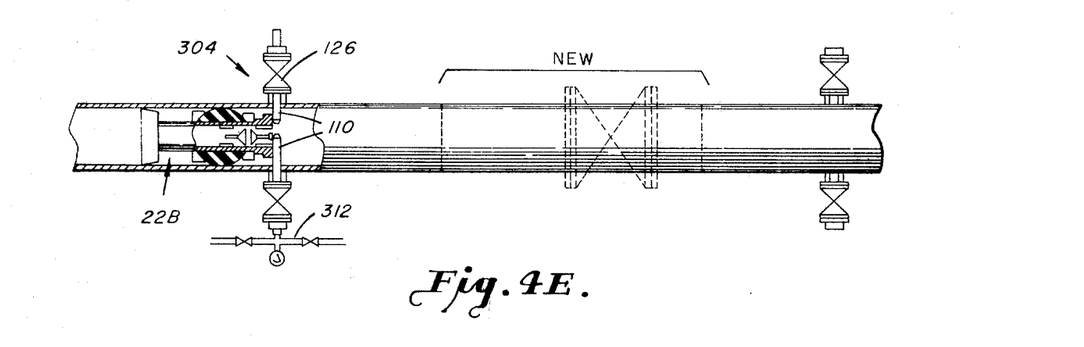

Thereafter operating pins 110 at station 3 at the upstream station 304 are radially inserted into the pipeline similar to that described above. A second pipeline pig of this invention and designated as 22B is likewise inserted into the pipe and by the flow pressure is moved through the pipe until its nose piece 46 strikes operating pins 110. In this position, the pipeline pigs will be in tandem position substantially as that shown in FIGURE 4B with full fluid flow through the pigs as desired. Although the fluid pressure in the pipe could be utilized to move pig 22A to position 302 it is preferred to use an inert fluid, e.g. water, from a separate source between positions 302 and 304. As such, operating pins 110 at station 304 are rotated to the position shown in FIGURE 3 closing valve 66 by the seating of valve 80 upon seat 70 yet retaining the pig in its position. Thereafter operating pins 110 at station 306 are withdrawn, closing the internal valve 66 and by reason of the pressure fluid as for example from source 310 moves pig 22A into abutment with the operating pins 110 at station 302. In this position, substantially as shown in FIGURE 4C, pipeline pigs 22A and 22B are now positioned with their respective valves 66 closed to further fluid flow (see FIGURE 3). Thereafter the inert fluid within the section to be repaired is exhausted through a pressure bleedoff line 312. In some instances where it is desirable not to interrupt the flow within the pipeline bypass flow systems, not shown, may be installed from a point above station 304 and the position of pig 22B to a point below station 302. At this point the undesirable section of pipe 300 is removed as shown in FIGURE 4D and replaced or repaired as necessary. In this particular instance this includes the removal of the elements making up station 306. Once the section has been replaced or repaired as shown in FIGURE 4E the operating pins 110 associated at station 302 are retracted from the pipeline. By rotating the operating pins 110, associated with pig 22B at station 304, to a position substantially shown in FIGURE 2, upstream pressure fluid is caused to pass through the pig 22B and force pipeline pig 22A downstream where it is removed. Subsequently the pins at station 304 are retracted closing the valve system 66 and the fluid pressure moves the pig downwardly to a point of removal. Thereafter the operating pins are removed and the associated valves 126 are closed and the completion plugs as described in FIGURES 8, 9 and 10 may be inserted and once again the pipeline continues its flow.

The invention has been described with reference to specific and preferred embodiments. It would be apparent, however, that other modifications can be made without departing from the spirit and scope of the invention.

What is claimed:
1. A pipeline pig comprising
 a central mandrel having an opening therethrough for fluid flow from the rear to the front;
 forward and rearward sleeves attached to said mandrel outward thereof;
 a double acting valve having
  a rearward portion operable to open and allow fluid flow across said portion,
  a forward portion operable to close when the pressure rearwardly is greater than the fluid pressure forward of said mandrel, and
  means to maintain said valves normally biased outwardly into closed positions;
 a substantially spherical packer slidably received about said mandrel so as to be outwardly exerted into the inner walls of said pipeline,
 at least one sealing cup attached to said mandrel and adapted to prevent unidirectional fluid flow in said pipeline from rearward to forward and hence move said pig along with said flow; and
 a valve actuating ring operably connected to said forward portion of said valve and normally biased outwardly of said forward sleeve wherein said portion is closed.

2. A pipeline pig of claim 1 wherein said packer is between two sealing cups.

3. A pig of claim 1 including means to create detectable audible signals.

4. A pig of claim 1 including rearwardly extending bumper members.

5. A pig of claim 1 including forward bumper nose formed as a part of said mandrel and circumferentially recessed adjacent said valve actuating ring to receive radial operating pins in said pipeline which act to prohibit line travel of said pig and actuate said ring whereby said valve is open to fluid flow therethrough.

6. A method of removing or repairing a section of fluid pipeline comprising:
 establishing a downstream station beyond the limits of said section to be repaired
 establishing an upstream and an intermediate station above the limits of said section to be repaired,
 providing at each station at least one radially movable operating pin including means to rotate said pin,
 inserting first and second pig members each having means about a mandrel to sealably engage said pipeline, and a valve which, when opened, will allow said fluid to flow through said pig, said valve operable by said operating pins from the exterior of said pipeline,
 stopping said first pig at said intermediate station and opening said valve in said pig using said operating pin,
 stopping said second pig at said upstream station and maintaining its said valve closed,
 releasing said first pig and closing its valve,
 supplying fluid pressure behind said first pig to move said pig to said downstream position and maintaining said valve closed,
 removing said supply fluid from between said first and second pigs,
 repairing or replacing said section of pipeline, and
 releasing and removing said first and second pigs.

7. A method according to claim 6 wherein the fluid supplied between said first and second pigs to move said first pig to said downstream station is an inert fluid.

8. A method according to claim 6 wherein the last releasing and removing step comprises
 opening the valve of said second pig with said operating pin at said upstream station,
 closing the valve and releasing said first pig for travel to a removal point under the pipeline fluid flow pressure,
 thereafter closing the valve and releasing said second pig for travel to a removal point under the pipeline fluid flow pressure.

References Cited
UNITED STATES PATENTS

| | | | |
|---|---|---|---|
| 3,040,779 | 6/1962 | Guier | 138—97 |
| 3,106,735 | 10/1963 | Landrum | 138—97 X |
| 3,183,939 | 5/1965 | Immel | 138—97 |
| 3,285,290 | 11/1966 | Morrison | 138—97 |
| 3,298,399 | 1/1967 | Slade | 138—97 |

HERBERT F. ROSS, Primary Examiner